United States Patent
Haimer et al.

(10) Patent No.: US 10,165,629 B2
(45) Date of Patent: Dec. 25, 2018

(54) INDUCTION COIL UNIT

(75) Inventors: Franz Haimer, Ingenhausen (DE);
Wolfgang Kugle,
Aichach-Griesbeckerzell (DE)

(73) Assignee: HAIMER GMBH,
Hollenbach-Igenhausen (DE)

(*) Notice: Subject to any disclaimer, the term of this patent is extended or adjusted under 35 U.S.C. 154(b) by 427 days.

(21) Appl. No.: 14/344,735

(22) PCT Filed: Sep. 11, 2012

(86) PCT No.: PCT/EP2012/067720
§ 371 (c)(1),
(2), (4) Date: Mar. 13, 2014

(87) PCT Pub. No.: WO2013/037763
PCT Pub. Date: Mar. 21, 2013

(65) Prior Publication Data
US 2014/0361008 A1 Dec. 11, 2014

(30) Foreign Application Priority Data

Sep. 13, 2011 (DE) .......................... 10 2011 082 613

(51) Int. Cl.
*H05B 6/36* (2006.01)
*H05B 6/10* (2006.01)
(Continued)

(52) U.S. Cl.
CPC .............. *H05B 6/14* (2013.01); *B23P 11/027* (2013.01); *H05B 6/101* (2013.01); *H05B 6/36* (2013.01); *H05B 6/365* (2013.01)

(58) Field of Classification Search
CPC ......... B23P 11/027; H05B 6/101; H05B 6/36; H05B 6/365; H05B 6/14; H05B 6/10; H05B 6/02; H05B 6/04; H05B 6/102; H05B 6/44
(Continued)

(56) References Cited

U.S. PATENT DOCUMENTS

| 2,288,039 A | 6/1942 | Somes |
| 2,942,089 A | 6/1960 | Baker et al. |

(Continued)

FOREIGN PATENT DOCUMENTS

| DE | 922700 C | 1/1955 |
| DE | 1094893 | 12/1960 |

(Continued)

OTHER PUBLICATIONS

International Search Report dated Jan. 3, 2013 in connection with PCT/EP2012/067720.
(Continued)

*Primary Examiner* — Michael Laflame, Jr.
(74) *Attorney, Agent, or Firm* — Kilpatrick Townsend & Stockton LLP

(57) ABSTRACT

The induction coil unit for heating a component which is rotationally symmetrical relative to an axis, includes a plurality of coils arranged about the axis of the tool holder, with pole elements, which are movable radially with respect to the axis, of which pole elements each one consists of includes a stack of pole rods that can be moved relative to one another. A yoke ring connects the pole elements, which, when the coils are excited by alternating current in the tool holder, produce a magnetic flux running in the peripheral direction to inductively heat the tool holder. The pole rods of each pole element can be moved jointly by means of pinion rollers, wherein, however, slide couplings or the like are provided in the drive force transmission path between the individual pole rods so that the pole elements can adapt to different contours of the tool holder.

14 Claims, 3 Drawing Sheets

(51) Int. Cl.
*H05B 6/02* (2006.01)
*H05B 6/04* (2006.01)
*H05B 6/44* (2006.01)
*H05B 6/14* (2006.01)
*B23P 11/02* (2006.01)

(58) Field of Classification Search
USPC .......................................................... 219/643
See application file for complete search history.

(56) References Cited

U.S. PATENT DOCUMENTS

| | | | | |
|---|---|---|---|---|
| 4,745,251 | A * | 5/1988 | Vickers | H05B 6/101 |
| | | | | 219/641 |
| 4,761,527 | A | 8/1988 | Mohr | |
| 6,712,367 | B1 | 3/2004 | Hon et al. | |
| 6,867,396 | B2 | 3/2005 | Haimer | |
| 6,900,418 | B2 | 5/2005 | Haimer et al. | |
| 6,991,411 | B2 | 1/2006 | Hon et al. | |
| 2003/0168445 | A1 | 9/2003 | Haimer | |
| 2004/0160020 | A1 | 8/2004 | Irion et al. | |
| 2008/0277386 | A1 | 11/2008 | Haimer | |
| 2010/0200571 | A1* | 8/2010 | Haimer | B23P 11/027 |
| | | | | 219/632 |
| 2011/0284525 | A1 | 11/2011 | Haimer et al. | |
| 2016/0113069 | A1* | 4/2016 | Haimer | B23B 31/1179 |
| | | | | 219/635 |

FOREIGN PATENT DOCUMENTS

| | | |
|---|---|---|
| DE | 19915412 A1 | 10/2000 |
| DE | 19915423 A1 | 10/2000 |
| DE | 10046547 | 3/2002 |
| DE | 10157432 A1 | 6/2003 |
| DE | 20203784 U1 | 7/2003 |
| DE | 102005005892 A1 | 8/2006 |
| DE | 102005014984 A1 | 10/2006 |
| DE | 102008045781 A1 | 3/2010 |
| FR | 1524221 | 5/1968 |
| JP | 2010244998 | 10/2010 |
| WO | 0189758 | 11/2001 |
| WO | WO-2006084678 A1 | 8/2006 |
| WO | WO-2008098752 A2 | 8/2008 |

OTHER PUBLICATIONS

Search Report dated Apr. 25, 2012 in connection with corresponding DE Application No. 102011082613.0.
International Preliminary Report on Patentability and Written Opinion dated Mar. 18, 2014 in connection with PCT/EP2012/067720.
U.S. Appl. No. 11/883,905, Notice of Allowance dated Feb. 12, 2018, 9 pages.
German Application No. 102005005892.2, Office Action dated Jun. 30, 2015, 10 pages.
International Application No. PCT/EP2006/001104, International Preliminary Report on Patentability dated Aug. 14, 2007, 11 pages (6 pages of English translation and 5 pages of Original document).
International Application No. PCT/EP2006/001104, International Written Opinion dated Aug. 9, 2007, 10 pages (5 pages of English translation and 5 pages of Original document).

* cited by examiner

INDUCTION COIL UNIT

The invention relates to an induction coil unit for heating a component which is rotationally symmetrical relative to an axis and made of an electrically conductive material and, in particular, for heating a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its opening that is central with respect to the rotational axis.

It is known to shrink the cylindrical shaft of a tool to be driven to rotate, for example a drill or a milling cutter, into a substantially cylindrical receiving opening of a tool holder. The tool shaft has an excess dimension in relation to the internal diameter of the receiving opening. To insert or remove the tool shaft, the sleeve part of the tool holder contained in the receiving opening is heated until the internal diameter of the receiving opening has expanded to such an extent that the tool shaft can be inserted or removed. After cooling, the sleeve part holds the tool shaft in a press fit.

While the insertion of the tool shaft into the tool holder that has been expanded by heat generally proceeds without problems, the tool holder has to be heated so quickly to remove the tool shaft from the tool holder that the tool holder expands before the tool shaft is also heated by heat conduction, which leads to the tool shaft jamming in the tool holder and makes the unclamping of the tool more difficult, if not even impossible.

It is known to inductively heat the tool holder that generally consists of steel, i.e. an electrically conductive material, by means of an induction coil unit. The induction coil of conventional apparatuses coaxially surrounds the tool holder here. An induction coil of this type produces an axially running magnetic flux, which heats the tool holder surrounded by said induction coil.

However, it has been shown that an induction coil of this type produces stray magnetic fields, which not only heat the tool holder but, to a certain extent, also the tool held therein in a press fit. In order to avoid this, it is known from DE 199 15 412 A1 to cover the and face of the induction coil adjacent to the tool with a pole disc made of soft magnetic material, for example ferrite. The pole disc resting on the tool-side end of the tool holder concentrates the magnetic flux in the tool holder and to a certain extent shields the tool shaft from stray fields. The induction coil known from DE 199 15 412 A1 cannot, however, uniformly heat the tool holder, so damage to the tool holder from overheating can occur locally. Moreover, the pole disc resting on the end of the tool holder prevents radially projecting tools guided directly up to the end of the tool holder being able to be shrunk in.

A further induction coil unit is known from DE 10 2005 005 892 A1, in which a plurality of pole elements distributed in the peripheral direction and made of soft magnetic material are radially adjustably arranged in a yoke ring made of soft magnetic material. The pole elements have and faces radially facing the tool holder, which can be brought into linear abutment contact with the peripheral face of the tool holder. The pole elements are surrounded by separately associated coils and induce, when they are fed in a manner known per se with alternating current, magnetic fluxes in the tool holder, said magnetic fluxes flooding through the tool holder in the peripheral direction and producing eddy currents heating the tool holder. Since the pole elements rest on the peripheral face of the tool holder, a pole disc, which rests on the end face of the tool holder, as provided in DE 199 15 412 A1, is superfluous, and accordingly, radially projecting tools can be shrunk in up to the and of the tool holder.

In the induction coil unit known from DE 10 2005 005 892 A1, the axial ends of the end faces of the pole elements resting on the outer face of the tool holder run at a spacing from the tool holder, which increases the magnetic resistance of the magnetic flux circuit in the region of the ends, so a local overheating of the tool holder in these regions is adequately avoided for many applications. However, it has been shown that adapting the end faces of the pole elements is laborious and is not sufficient for many applications to avoid local overheating of the tool holder.

With respect to a first aspect, it is the object of the invention to provide an induction coil unit for heating a rotationally symmetrical component, in particular a sleeve part, for example a tool holder, which can be adapted more easily than previously to different components, in order to heat the component more uniformly than previously.

The invention is based on an induction coil unit for heating a component which is rotationally symmetrical relative to an axis and made of electrically conductive material, in particular a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its receiving opening that is central with respect to the rotational axis, said induction coil unit comprising:

- a receiving space that is central with respect to the axis for the component,
- an in particular even number of pole elements, which are distributed about the axis, in particular at equal angular intervals and made of a material with soft magnetic, magnetic-flux-conducting properties,
- at least one coil that can be fed with alternating current to produce magnetic fluxes in the pole elements, in particular a plurality of these coils,
- wherein the pole elements are movably guided on the unit radially with respect to the axis and can be moved between a first position close to the axis and a second position remote from the axis and
- wherein the pole elements have end faces substantially radially facing the axis, which end faces have abutment contact or virtual abutment contact with the outer peripheral face of the component in the first position, at least in a portion of their axial height along a generatrix of an outer peripheral face of the component.

The above-mentioned object is achieved according to the invention with respect to the first aspect in that at least the portion of the end face of each pole element intended for abutment or virtual abutment is formed as an apex region extended along the axis of part faces running toward one another toward the axis, the radial height of the axially normal cross-sectional face of the pole element that is limited by the part faces being varied radially with respect to the axis and/or the radius of curvature of the apex region being varied in the axially normal cross-sectional face and/or the width of the apex region, viewed in the peripheral direction of the component, being varied in the axially normal cross-sectional face along the axis.

Owing to the variation in the radial height and/or the radius of curvature and/or the apex region width due to the configuration of the part faces running toward one another, with a "transverse field coil" deflecting the magnetic flux in the peripheral direction of the component, the local magnetic resistance of the end faces can easily be varied and the magnetic flux in the component thus varied and adapted locally in a shunt to the regions of the end face resting on the component.

The generatrix of the outer peripheral face is the contour limiting line in the mathematical sense. If here and below the radial direction, axial direction or peripheral direction are mentioned, these direction details always relate to the axis mentioned. Pole elements and materials also mentioned otherwise here and below with soft magnetic, magnetic-flux-conducting properties, such as, for example, pole rods or yokes or the like, consist of electrically non-conductive material, so as not to produce any eddy current losses in these elements. The number of pole elements and/or coils is preferably even. It is obvious that an odd number of pole elements and/or coils can also be used.

The pole elements may be one-piece plates or rods with a rectangular, square or round cross-section and, correspondingly, the form of the end face varies along the one-piece element. It is obvious that the region of the end face can also be an operationally removable part of the otherwise one-piece pole element, as described in DE 10 2005 005 892 A1.

In a preferred configuration, which allows the pole element to also adapt to a contour of the component that varies in the direction of the axis, at least one, or preferably all, of the pole elements are configured as a stack of a plurality of pole rods, which are movably guided relative to one another radially with respect to the axis and parallel to one another. The ends of these pole rods facing the axis form separate apex regions, the radial height of the axially normal cross-sectional faces limited by the part faces being varied radially with respect to the axis and/or the radius of curvature of the apex region being varied in the axially normal cross-sectional faces and/or the width of the apex region, viewed in the peripheral direction of the component, varying in the axially normal cross-sectional face along the stack direction, at least between two pole rods that are adjacent in the stack. In this configuration, not only can the magnetic flux be influenced, but it can also be ensured that the pole element configured as a stack of pole rods can automatically adapt to the outer contour of the component. A pole element of this type may, for example, rest on a conical outer casing, even when the cone angle of the component varies from component to component or else within the component. The stack of pole rods sufficiently approximates the peripheral contour of the component in practice, even if the generatrixes of the end faces of the individual pole rods run axially parallel to the axis.

The variation in the end faces of the pole elements or pole rods, in each case viewed in the sectional planes normal to the axis, allows the magnetic flux to be locally adapted to a varying material cross-section of the component to be heated. Especially in the case of tool holders, the material cross-section of the sleeve portion receiving the tool shaft increases from the tool insertion side, i.e. the tool holder has a conical outer casing in this region, and the peripheral length, within which the magnetic flux surrounds the cone, accordingly also changes. In order to ensure a uniform heating of a component with a material cross-section increasing in the direction of the axis, in particular of a sleeve part with a conical outer casing, it is expediently provided that with a material cross-section of the component increasing along the axis, the radial height of the axially normal cross-sectional face limited by the part faces decreases radially with respect to the axis and/or the radius of curvature of the apex region in the axially normal cross-sectional face increases and/or the width of the apex region, viewed in the peripheral direction of the component, increases in the axially normal cross-sectional face.

In a particularly simple configuration, the part faces inclined toward one another and the apex faces are substantially level faces, which limit a trapezoidal, axially normal cross-sectional face. As an alternative, the part faces inclined toward one another and/or the apex face may be convexly curved faces, which limit an arcuate, limited axially normal cross-sectional face.

It is obvious that the end face of the pole elements may be varied, uniformly changing in accordance with the above-described principles in the direction of the axis, specifically regardless of whether the pole elements are configured in one piece or are configured as a stack of pole rods. The variations may, however, take place in a stepped manner in the case of pole elements constructed of pole rods.

The pole rods are displaceable against one another within the stack of each pole element and can be guided directly on one another or else on guide faces of a predetermined pole rod of the stack transversely to the displacement direction, as described, for example, in DE 10 2005 005 892 A1. Alternatively, the pole rods can also, however, be guided on faces that are fixed to the housing of the induction coil unit.

During operation, the pole rods should enter abutment contact with the outer casing of the component. Pressing forces suitable for this are already produced by the magnetic field during the alternating current excitation of the coils. However, it has been found that the magnetic field forces are sometimes insufficient to bring all the pole rods into secure abutment contact with the component, in particular when a part of the pole rods already closes the magnetic flux circuit, while other pole rods are still spaced apart from the component. As described in DE 10 2005 005 892 A1, feed springs can be associated with the individual pole rods and can ensure adequate, uniform contact pressure forces. However, in this configuration, care then has to be taken that the pole rods can be pushed back again into the second position to remove the component from the induction coil unit by suitable mechanisms, which leads to a comparatively large construction outlay, in particular if the pole rods of each stack are to follow a changing contour of the component.

With regard to a second aspect of the invention, which contains a preferred development of the first aspect, but also has independent patentable significance, it is provided that at least one or all the pole elements are in turn configured as a stack of a plurality of pole rods movably guided relative to one another radially with respect to the axis and parallel to one another, the ends of which pole rods facing the axis form the end face of the pole element, and that a drive mechanism is associated with the pole elements configured as a stack of pole rods, said drive mechanism driving the pole rods jointly for the movement between the first and second position, in particular positively, wherein a device limiting the drive force to be transmitted, in particular a slide coupling, is arranged between a drive member and at least a partial number of pole rods in the drive force transmission path.

In a configuration of this type, the pole rods of each stack can be pushed jointly from a manual or motor drive member against the outer face of the component into abutment contact. The drive-force-limiting devices ensure here that the abutment contact of the individual pole rods with the component also takes place when the path to be covered by the individual pole rods is not equal because of the outer contour of the component. The drive mechanism can be used both for the feed movement and for the return movement of the pole rods.

The drive member drives the pole rods over drive force transmission paths, which contain devices that are separate from one another and limit the drive force. The drive force transmission paths may be connected in series here if the slide couplings are designed for the forces that are then to be transmitted in a staggered manner. Parallel transmission paths from the drive member to the individual pole rods are also suitable, since equally dimensioned drive force limiting devices, such as, for example, slide couplings, can be used here. In a particularly simple configuration, it is provided that at least a partial number of pole rods of each pole element each has a linear tooth system, which meshes with a pinion, which has a drive connection by means of a slide coupling in each case to the drive member or another of the pinions. Each pole rod to be driven expediently comprises a linear tooth system of this type, while slide couplings are only provided between pinions of the type that have to complete additional paths or avoid them in accordance with the outer contour of the component. A simple and operationally reliable configuration provides here that the pinions and the slide couplings are arranged on a common shaft parallel to the axis. A shaft of this type is expediently provided for each pole element configured as a stack of pole rods. In particular, the shaft is also utilised to guide the pole rods. In order to be able to drive the individual shafts from a common drive member, the shaft carries a gear wheel, which meshes with a ring gear wheel that is concentric with the axis and has a rotary drive connection to the drive member.

The general aim of the present invention is to configure the induction coil unit in such a way that it can be used as diversely as possible and therefore to heat components with different outer contours in the region to be heated. One of the parameters, with respect to which the components, in other words, for example, the tool holders, can be distinguished, is the length of the axial region to be heated. The receiving sleeve of the tool holder should only be heated over the length of that region in which the tool shaft is held in a press fit. Regions of the receiving sleeve not involved in the press fit should not be affected by heating in order to prevent long term damage to the tool holder. Unnecessarily heating large regions of the tool holder not only increases the energy requirement during heating, but also the energy requirement during the following cooling and brings about a lengthening of the cycle time when clamping and unclamping the tool.

With regard to a third aspect, the object of the invention is to show a method as to how the region to be heated of the component can be limited to a desired extent in the direction of the axis. This aspect forms a preferred development of the invention with regard to the aforementioned first and second aspects, but also has independent inventive significance in induction coil units with other end face configurations of the pole elements or another drive of pole elements consisting of pole rods.

According to the third aspect of the invention it is provided that at least one or all the pole elements are configured as a stack of a plurality of pole rods that are movably guided relative to one another radially with respect to the axis and parallel to one another, the ends of which facing the axis form the end face of the pole element, a blocking mechanism being associated with the pole element, by means of which blocking element the movement of at least one of its pole rods can be blocked in the second position or a third position with a radial spacing from the first position.

The blocking mechanism firmly holds the blocked pole rod at a spacing from the component, while the unblocked pole rods are either forcibly driven jointly or are placed by spring force or magnetic force against the component, as described above. If the pole rods according to the second aspect of the invention are driven jointly, the drive force-limiting device, in other words, for example, the slide coupling of the blocked pole rod, ensures that the unblocked pole rods can be placed against the component.

By means of the blocking device, individual pole rods, within the stack of pole rods, can be blocked in the drawn-back and therefore inactive position. This allows selective adjustment of a heating profile even with a constant axial length of the region to be heated on the component. In a preferred configuration it is provided that at least the pole rod situated axially furthest out in the stack or a group of a plurality of adjacent pole rods situated axially furthest out in the stack can be blocked. The axial thermal action region of the induction coil unit can thus be easily controlled.

In a simple configuration, the blocking mechanism, adjacent to the stack of pole rods, has a movable blocking element, which cooperates with stop faces on the pole rods to be blocked, with counter-stop faces for the stop faces of the pole rods to be blocked. The blocking element can be configured as a cam roller, which can be rotatably driven axially parallel to the axis, the cams of which form counter-stop faces cooperating with the stop faces of the pole rods. In order to easily be able to vary and adjust the number of pole rods to be blocked, the stop faces and/or counter-stop faces, in relation to the movement direction of the pole rods and/or of the blocking element, can be arranged staggered, so that they are used with a different adjusting lift.

All the blocking elements preferably have a forced drive connection to a common drive member, for example such that the blocking elements are configured as cam rollers that can be rotated axially parallel to the axis and have pinions that are coupled to a ring gear wheel that is concentric with the axis and can be driven by the drive member. The drive member may in turn be a manual drive member, but also a motorised drive.

In contrast to the induction coil units of the type known from DE 199 15 412 A1, the space intended to receive the component to be heated and therefore also the component mentioned therein is easy to access in induction coil units according to the invention, which facilitates handling. Furthermore, the axial overall height is reduced, which improves the use possibilities.

The invention will be described in more detail below with the aid of the drawings. In the drawings.

Figure 1:
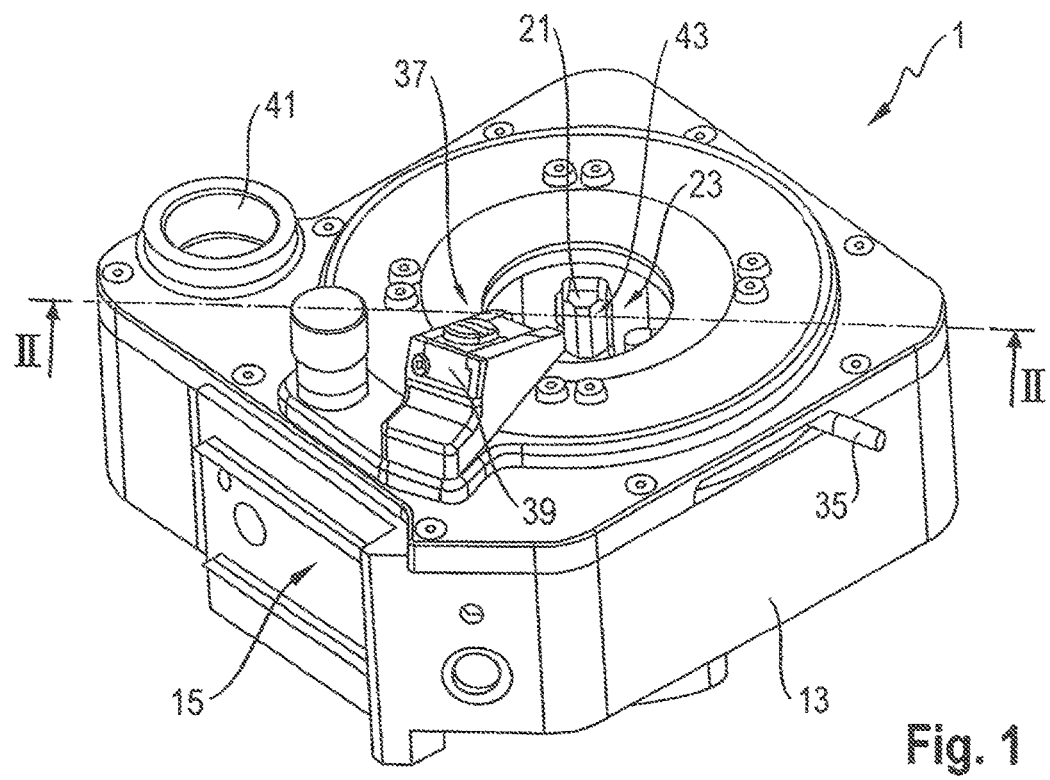
FIG. 1 shows a perspective view of an induction coil unit for the inductive heating of a tool holder to clamp and unclamp a rotating tool.
Figure 2:
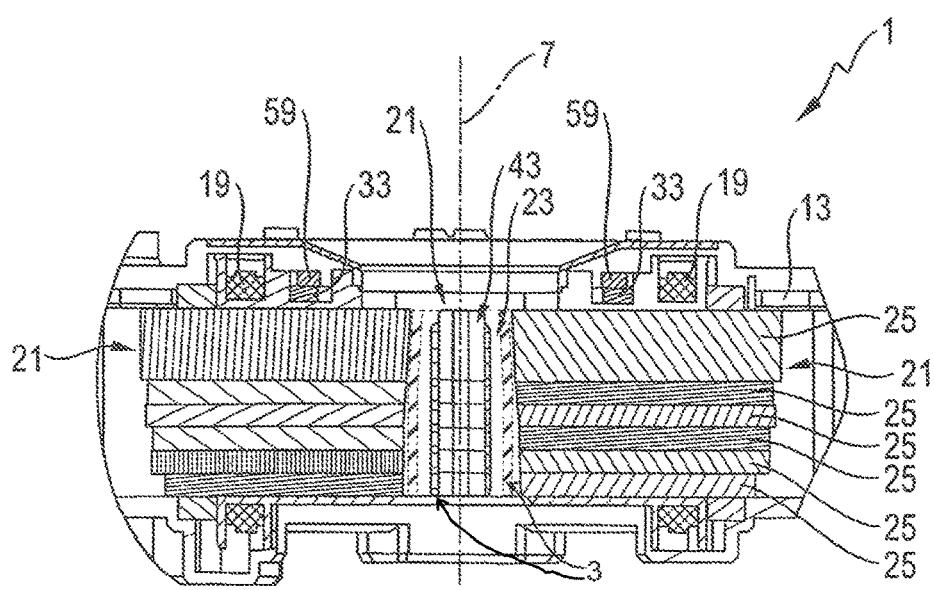
FIG. 2 shows a part of a sectional view through the induction coil unit, viewed along a line II-II from FIG. 1.
Figure 3:
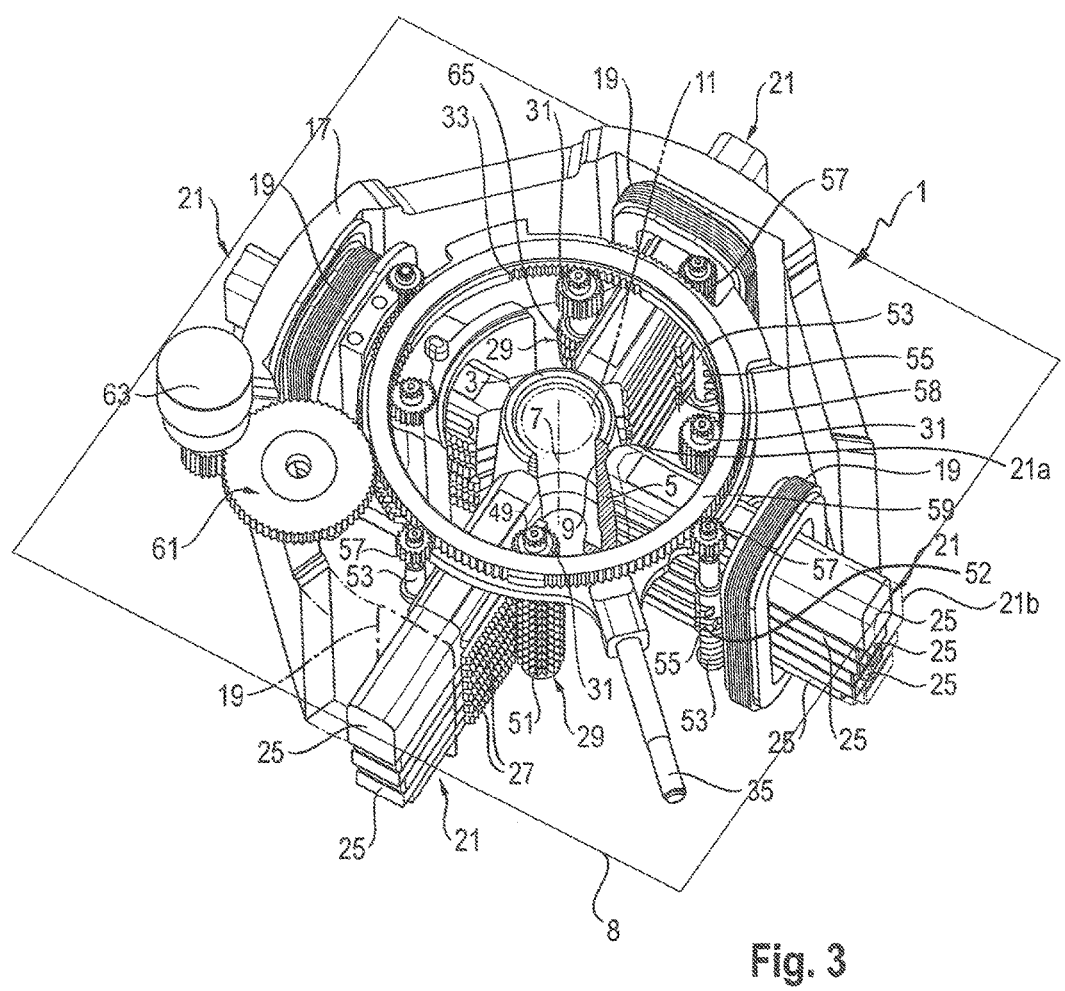
FIG. 3 shows a partially broken-open perspective view of the induction coil unit, in which for a clearer view, its housing and one of its coils are not shown.

FIGS. 1 to 3 show an induction coil unit 1, with the aid of which a sleeve part 3, shown brokenopen in FIG. 3, made of electrically conductive material, in this case steel, of a tool holder 5 can be heated by an inductive method. The tool holder 5, which is substantially rotationally symmetrical with respect to its rotational operating axis 7, called the "axis" below, has a receiving opening 9, which is central with respect to the axis 7, for receiving, with a press fit, a shaft 11, indicated by a dash-dot diameter line, of a rotary tool, otherwise not shown, rotating about the rotational axis 7 during work operation, for example a drill or milling cutter. The tool shaft, in relation to the internal diameter of the cylindrical receiving opening 9, has an excess dimension and is shrunk into the sleeve part 3. During heating, the sleeve part 3 widens so the tool shaft 11 can be inserted into the receiving opening 9 or removed therefrom. After cooling, the tool shaft 11 inserted in the receiving opening 9 is held in a press fit in the sleeve part 3. The tool holder 5 may be a component of a work spindle of a machine tool or may be provided on the side axially remote from the sleeve part 3 with a conventional spindle coupling such as, for example, a quick-release taper coupling or a hollow shaft coupling (HSC coupling).

The induction coil unit 1 has a substantially annular housing 13 manufactured from electric insulating material, in this case with a rectangular outer contour, which is axially displaceably held in operation on an, in particular, vertical guide of a shrink apparatus in a manner not shown in more detail at 15.

The housing 13 encloses a yoke ring 17, which is optionally composed of segments, made of a soft magnetic material, for example ferrite, which conducts magnetic flux but is electrically non-conductive, and carries, on the inside of its ring, a plurality of coils 19 arranged at equal angular intervals about the axis 7 and preferably wound from high-frequency litz wire as can be seen from FIG. 3. The coils 19 are arranged in an even number with equal angular intervals and with coil axes lying in a common axially normal plane 8 about the axis 7, one of the coils being indicated only by a dot-dash line for the sake of clarity. The coils 19, in relation to their diameter, are arranged flat and with a coil axis that is radial with respect to the axis 7. It is obvious that the "transverse field" described above can also be produced with less coils, but also more coils, than would correspond to the number of pole elements. In the individual case, a single coil is sufficient.

Each of the coils 19 surrounds a pole element 21 made of soft-magnetic material, in accordance with the yoke ring 17, which conducts magnetic flux, but is not electrically conductive, for example ferrite, which is displaceably guided on the housing 13 and/or the yoke ring 17 and/or the coils 19 and in the manner which will be described in more detail below. Each pole element 21 passes through the coil 19 here and projects into a receiving space 23 limited by the coils 19 (FIGS. 1 and 2) to receive the sleeve part 3 of the tool holder 5. The pole elements 21 can be displaced radially up to close to the axis 7 in a manner which will be described in more detail below, so, in a first position 21a, they can also rest on the sleeve parts 3 with a greatly differing diameter. The pole elements 21 can be moved by a drive, which will be described in more detail below, away from the axis 7 into a second radially outer position, a second position 21b in which the sleeve part 3 can be inserted into the receiving space 23 or removed from the receiving space 23.

The pole elements 21 are configured as a stack of pole rods 25 arranged one above the other in the direction of the axis 7, in each case six pole rods 25 here, which can be radially moved jointly, but are displaceable relative to one another radially with respect to the axis 7. Each of the pole rods 25 comprises a rack-like linear tooth system 27, which meshes with a pinion shaft 29 that is jointly associated with the pole rods 25 of each rod. The pinion shafts 29 are arranged axially parallel with respect to the axis 7 and each carry a drive gear wheel 31, which in turn meshes with a common first ring gear wheel 33 that is coaxially rotatable with respect to the axis 7 in the housing 13. The ring gear wheel 33 carries a hand lever 35 that is accessible outside the housing 13 and by means of which the ring gear wheel 33 can be rotated and thus the pole elements 21 can be moved jointly radially with respect to the axis 7 by means of the pinion rollers 29.

During operation, the tool holder 5 is stationarily fixed to a receptacle or holder, not shown in more detail, while the induction coil unit 1 is displaceably guided coaxially with respect to the axis 7 of the tool holder along a generally vertical guide rail, also not shown, in order to be able to introduce the tool holder 5 into the receiving space 23 of the induction coil unit 1. On the tool insertion side of the tool holder 5, the induction coil unit 1 carries a stop 37 (FIG. 1), which, in the operating position, rests on an axial end face of the tool holder 5 and ensures a reproducible position of the induction coil unit 1 relative to the tool holder 5. The stop 37 has a stop finger 39, which is adjustable obliquely with respect to the axis 7 but guided no that it can be stopped, as already explained in DE 10 2005 005 892 A1. Once the induction coil unit 1 has been guided up until the stop 37 rests on the tool holder 5, the pole elements 21 are brought by means of the hand lever 35 into abutment contact on the outer casing of the sleeve portion 3. The following excitation of the coils 19 with alternating current induces in the sleeve portion 3 a magnetic flux, which runs in the peripheral direction and heats the sleeve portion 3 to clamp or unclamp the tool shaft. By means of a coolant connection that can be seen at 41 in FIG. 1, cooling air or cooling liquid is guided via one or more nozzles against the heated tool holder 5, which is cooled thereby to a temperature that is not dangerous to touch.

The tool holder 5 has, as shown in FIG. 3, a conical outer casing, while the inner casing forming the receiving opening 9 is cylindrical. Both the thickness of the material cross-section and the outer peripheral length of the receiving sleeve 3 therefore increase in the direction of the axis 7 from the tool insertion side located at the top in FIG. 3. The changing dimensions influence the eddy current excitation in the receiving sleeve 3 and therefore the local heating, which would change in the axial direction without counter-measures.

In order to ensure uniform heating of the receiving sleeve 3 in the direction of the axis 7, the pole elements 21 have end face regions 43, the cross-sectional contour of which changes based on planes normal to the axis 7, in the direction of the axis 7, at least between two adjacent pole pieces 25.

Figure 4A:
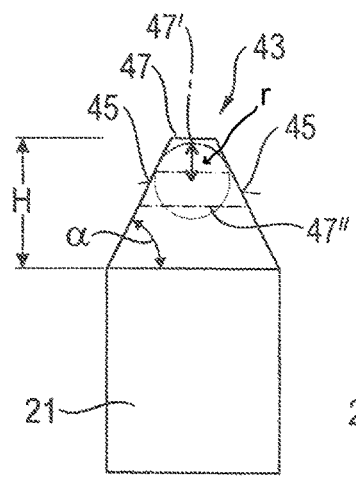
FIG. 4 shows a schematic view of a plurality of pole rods of a stack of pole rods of the induction coil unit of FIG. 1.
Figure 4B:
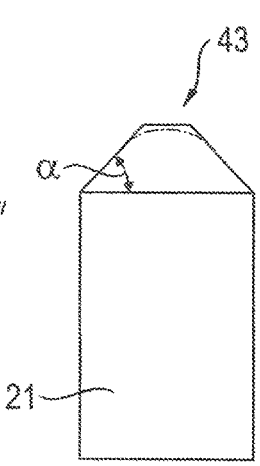
Figure 4C:
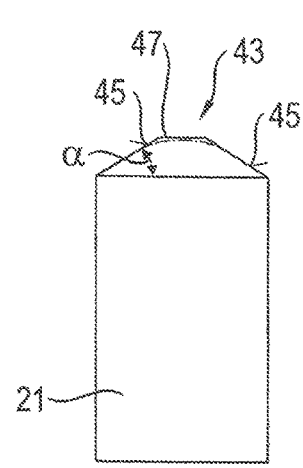

FIG. 4 schematically shows plan views of pole rods 21, viewed in the direction of the axis 7. FIG. 4a shows the plan view of the pole pin resting in the region of the tool insertion side on the region with the smallest diameter of the outer casing of the receiving sleeve 3, while FIG. 4c shows the contour of the pole pin 21 resting in the region with the largest diameter of the outer casing. FIG. 4b shows one of the pole pins 21 arranged between the uppermost and the lowermost pole pin in the stack.

The contour of each end face region 43 is fixed by two part face regions 45 inclined toward one another (FIG. 4a) which merge with one another in an apex region 47 intended to rest on the outer casing of the receiving sleeve 3 of the tool holder 5 and extending in the direction of the axis 7. In the embodiment shown, the lateral part faces 45 and the face of the apex region 47 are level and limit a trapezoidal cross-section, the side face angle α of which decreases in the direction of the axis 7 from the region with the smallest diameter of the outer casing to the region with the largest diameter. The width of the level apex face, viewed in the peripheral direction of the tool holder 5, is approximately constant from pole rod to pole rod, but the radial height H decreases accordingly.

As indicated by dash-dot lines in FIGS. 4a to 4c, the level apex face 47 can also be replaced by a curved apex face 47'. The curvature can optionally also extend at least over a part region of the part faces 45. The radius of curvature r increases here in the direction of the widening conical outer casing of the sleeve portion. In this configuration, the pole rods 21 can form rounded end face regions 43, at least in the apex region. Also alternatively, the inclination angle a can be the same from pole rod to pole rod, the height H then decreasing in the direction of the widening cone face of the outer casing, as additionally indicated for the lowermost pole rod relative to the contour of the uppermost pole rod, for example in FIG. 4a at 47".

The variation can take place continuously in the direction of the axis or discontinuously from pole rod 21 to pole rod 21, in other words in steps. By varying the end face cross-section of the pole rods, the transition of the magnetic flux from the pole rod to the tool holder is varied and therefore the magnetic flux strength and, accordingly, the eddy flow amplitude, are varied in the contact region of the pole rod. It is obvious that end region cross-sections varying in the direction of the axis 7 can also be applied in the case of one-piece pole elements, in other words pole elements which are not constructed in a segmented manner from stacked pole rods.

The induction coil unit 1 should also be able to be used as diversely as possible in tool holders with a different cone angle of its outer casing. In order to ensure that the and face region 43 of each pole rod 25 taken individually, even with a variation of the cone angle, comes into abutment contact with the outer casing, the pinion roller 29 on a common shaft rigidly connected to the drive wheel 31 carries a plurality of individual pinions 51 rotatably mounted on the shaft 49, which mesh with a linear tooth system 27 of one of the pole rods 25. The pinions 51 rotatably seated on the shaft 49 are coupled either to the shaft 49 or an adjacent pinion 51 by means of a slip clutch, e.g., slip clutch 65 identified in FIG. 3, in each case. The pinion shaft 29 can therefore not only drive all the pole rods 25 jointly, but also allows relative displacements between pole rods 25, the pinions 51 of which are driven by a slip clutch.

It is obvious that all the pinions 51 can be coupled by slip clutches to the shaft 49 but, in the individual case, with at least a part of the pole rod 25 resting in the region with the smallest diameter of the outer casing of the sleeve portion 3, the uppermost pole rod here, the associated pinion can also be positively coupled to the shaft 49, while other pinions 51 associated with the region with the largest diameter of the outer casing can be non-positively connected to a limited extent, for example by slip clutches, to the shaft 49. The slip clutches can be effective between the pinion and the shaft 49, so these pinions are driven parallel to one another. A serial arrangement is also conceivable in slip clutches, if their triggering torque from pinion to pinion reduces in the direction of the widening conical outer casing of the receiving sleeve 3.

The region of the receiving sleeve 3 of the tool holder 5 which is to be flooded by the magnetic flux should expediently be limited to the axial region, in which the tool shaft is held in a press fit in order, on the one hand, to only thermally load the tool holder 5 a little and, on the other hand, to reduce the cooling outlay and the timespan required for cooling. In conventional induction coil units, the region flooded by the magnetic flux is fixed by the axial dimensions of the pole elements bringing about the magnetic flux. In order to be able to change the number of pole rods 25 resting on the receiving sleeve 3 during operation, and therefore the effective axial height of the pole elements 21, cam rollers 53 are rotatably arranged to the side of the pole elements 21 in the peripheral direction, the cams 55 of which cam rollers cooperate with counter stop faces 52 integrally formed on the individual pole rods 25. The cams 55, when the pole rods 25 are drawn back radially by the tool holder 5, can be pivoted into the displacement path thereof and thus block the feed movement of the pole rod 25 toward the tool holder 5. The blocked pole rods 25 are then blocked with respect to the flooding.

Each of the cam shafts 53 carries a drive gear wheel 57, which meshes with a second ring gear wheel 59 in turn rotatably mounted coaxially with respect to the axis 7 in the housing 13. The ring gear wheel 59 can be driven by means of an intermediate gearing 61 by a rotary hand knob 63, so mutually corresponding pole rods 25 of the individual pole elements 21 can be blocked or released together. It is obvious that the hand actuation knob 63, like the hand lever 35, can optionally be replaced by electric motor drives.

The cams 55 and/or counter stop faces 52 are expediently staggered, so they engage successively depending on the rotation of the cam shafts 53 and, accordingly, a variable number of pole rods 25 can be blocked. Expediently, the staggering of the cams 55 and the counter stop faces 52 is selected such that, starting with the lowermost pole rod resting on the region with the largest diameter of the outer casing of the receiving sleeve 3, the pole rods can be blocked in sequence. However, it is obvious that pole rods optionally also arranged between the end pole rods 25 can be blocked in a targeted manner to control the heat distribution in a centre region of the stack.

The invention claimed is:

1. Induction coil unit for heating a component which is rotationally symmetrical relative to an axis and made of electrically conductive material, in particular a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its receiving opening that is central with respect to the rotational axis, comprising:

a receiving space that is central with respect to the axis for the component;

a plurality of pole elements, which are distributed about the axis, in particular distributed at equal angular intervals, made of a material with soft magnetic, magnetic-flux-conducting properties;

at least one coil that can be fed with alternating current to produce magnetic fluxes in the pole elements, in particular a plurality of these coils;

wherein the pole elements are movably guided on the unit radially with respect to the axis and are movable between a first position close to the axis and a second position remote from the axis; and wherein the pole elements have end faces substantially radially facing the axis, which, in the first position, at least in a part region of their axial height along a generatrix of an outer peripheral face of the component, have abutment contact, or virtual abutment contact, with the outer peripheral face of the component, and wherein at least one or all of the pole elements are configured as a stack of a plurality of pole rods, which are movably guided relative to one another radially with respect to the axis and parallel to one another, the ends of which pole rods facing the axis form the end face of the pole element, and in that a drive mechanism is associated with the pole elements configured as a stack of pole rods, which drive mechanism drives the pole rods jointly for the movement between the first and the second position, in particular positively, wherein a slip clutch limiting the drive force to be transmitted is arranged in the drive force transmission path between a drive member and at least one partial number of the pole rods, wherein at least a part region is formed as an apex region for abutment or minor abutment of an end face of each pole element and is extended along an axis of part faces running toward one another toward the axis, a radial height (H) of an axially normal cross-sectional face of the pole element, which is limited by the part faces, being varied radially with respect to the axis and/or a radius of curvature of the apex region being varied in the axially normal cross-sectional face and/or a width of the apex region, viewed in a peripheral direction of the component, being varied in the axially normal cross-sectional face along the axis.

2. Induction coil unit according to claim 1, wherein at least one or all of the pole elements are configured as a stack of a plurality of pole rods, which are movably guided relative to one another radially with respect to the axis and parallel to one another, the ends of which pole rods facing the axis form separate apex regions, the radial height (H) of the axially normal cross-sectional face that is limited by the part faces varying radially with respect to the axis and/or the radius of curvature of the apex region varying in the axially normal cross-sectional face and/or the width of the apex region, viewed in the peripheral direction of the component, varying in the axially normal cross-sectional face in the stack direction, at least between two pole rods adjacent in the stack.

3. Induction coil unit according to claim 2, wherein the radial height (H) of the axially normal cross-sectional face, which is limited by the part faces, and/or the radius of curvature of the apex region in the axially normal cross-sectional face and/or the width of the apex region, viewed in the peripheral direction of the component, in the axially normal cross-sectional face, remain the same within one and the same pole rod, in the longitudinal direction of the axis.

4. Induction coil unit according to claim 1, wherein to heat a component with a material cross-section which increases in the direction of the axis, in particular a sleeve part with a conical outer casing with a material cross-section of the component that increases along the axis, the radial height (H) of the axially normal cross-sectional face, which is limited by the part faces, decreases radially with respect to the axis and/or the radius of curvature of the apex region in the axially normal cross-sectional face increases and/or the width of the apex region, viewed in the peripheral direction of the component, increases in the axially normal cross-sectional face.

5. Induction coil unit according to claim 1, wherein the part faces inclined toward one another and the apex face are substantially level faces, which limit a trapezoidal, axially normal cross-sectional face, or in that the part faces inclined toward one another and the apex face are convexly curved faces, which limit an arcuate, limited axially normal cross-sectional face.

6. Induction coil unit for heating a component which is rotationally symmetrical relative to an axis and made of electrically conductive material, in particular a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its receiving opening that is central with respect to the rotational axis, comprising:

a receiving space that is central with respect to the axis for the component;

a plurality of pole elements, which are distributed about the axis, in particular distributed at equal angular intervals, made of a material with soft magnetic, magnetic-flux-conducting properties;

at least one coil that can be fed with alternating current to produce magnetic fluxes in the pole elements, in particular a plurality of these coils;

wherein the pole elements are movably guided on the unit radially with respect to the axis and are movable between a first position close to the axis and a second position remote from the axis; and wherein the pole elements have end faces substantially radially facing the axis, which, in the first position, at least in a part region of their axial height along a generatrix of an outer peripheral face of the component, have abutment contact, or virtual abutment contact, with the outer peripheral face of the component, and wherein at least one or all of the pole elements are configured as a stack of a plurality of pole rods, which are movably guided relative to one another radially with respect to the axis and parallel to one another, the ends of which pole rods facing the axis form the end face of the pole element, and in that a drive mechanism is associated with the pole elements configured as a stack of pole rods, which drive mechanism drives the pole rods jointly for the movement between the first and the second position, in particular positively, wherein a slip clutch limiting the drive force to be transmitted is arranged in the drive force transmission path between a drive member and at least one partial number of the pole rods, wherein the drive member drives the pole rods via drive force transmission paths, which contain mutually separate slip clutches limiting the drive force.

7. Induction coil unit according to claim 1, wherein at least a partial number of the pole rods of each pole element each has a linear tooth system, which meshes with a pinion, which, by means of one slide coupling each, has a drive connection to the drive member or another one of the pinions.

8. Induction coil unit according to claim 7, wherein the pinions and the slide couplings are arranged on a common shaft parallel to the axis.

9. Induction coil unit according to claim 8, wherein the shaft carries a gear wheel, which meshes with a ring gear wheel, which is concentric with respect to the axis and has a rotary drive connection to the drive member.

10. Induction coil unit for heating a component which is rotationally symmetrical relative to an axis and made of electrically conductive material, in particular a sleeve part, which holds an elongate item in a press fit in a receiving opening that is central with respect to the axis, preferably to heat the sleeve part of a tool holder, which holds a shaft of a rotary tool, in particular a drilling or milling tool, in a press fit in its receiving opening that is central with respect to the rotational axis, comprising:

a receiving space that is central with respect to the axis for the component;

a plurality of pole elements, which are distributed about the axis, in particular distributed at equal angular intervals, made of a material with soft magnetic, magnetic-flux-conducting properties;
at least one coil that can be fed with alternating current to produce magnetic fluxes in the pole elements, in particular a plurality of these coils;
wherein the pole elements are movably guided on the unit radially with respect to the axis and are movable between a first position close to the axis and a second position remote from the axis; and
wherein the pole elements have end faces substantially radially facing the axis, which, in the first position, at least in a part region of their axial height along a generatrix of an outer peripheral face of the component, have abutment contact, or virtual abutment contact, with the outer peripheral face of the component, and wherein at least one or all of the pole elements are configured as a stack of a plurality of pole rods, which are movably guided relative to one another radially with respect to the axis and parallel to one another, the ends of which pole rods facing the axis form the end face of the pole element, and in that a drive mechanism is associated with the pole elements configured as a stack of pole rods, which drive mechanism drives the pole rods jointly for the movement between the first and the second position, in particular positively, wherein a slip clutch limiting the drive force to be transmitted is arranged in the drive force transmission path between a drive member and at least one partial number of the pole rods,
wherein a blocking mechanism is associated with the pole element, by means of which blocking mechanism a movement of at least one of the pole rods of the pole element can be blocked in the second position or a third position with a radial spacing relative to the axis from the first position.

11. Induction coil unit according to claim 10, wherein at least the pole rod situated axially furthest out in the stack or a group of a plurality of adjacent pole rods situated axially furthest out in the stack can be blocked.

12. Induction coil unit according to claim 10, characterised in that the blocking mechanism, adjacent to the stack of pole rods, has a movable blocking element, which cooperates with stop faces on the pole rods to be blocked, comprising counter-stop faces for the stop faces of the pole rods to be blocked, in particular when the blocking element is configured as a cam roller that can be rotatably driven axially parallel to the axis, the cams of which form counter-stop faces cooperating with the stop faces of the pole rods.

13. Induction coil unit according to claim 12, wherein the stop faces and/or counter-stop faces, in relation to a movement direction of the pole rods and/or the blocking element, are staggered.

14. Induction coil unit according to claim 12, wherein all the blocking elements are connected by a ring gear wheel and an intermediate gearing to a common drive member, in particular when blocking elements are configured as cam rollers, which can be rotated axially parallel to the axis, and have pinions, which are coupled to the ring gear wheel, which is concentric with the axis and can be driven by the drive member.

* * * * *